UNITED STATES PATENT OFFICE.

CHARLES B. JACOBS, OF EAST ORANGE, NEW JERSEY, ASSIGNOR TO THE AMPERE ELECTRO CHEMICAL COMPANY, OF AMPERE, NEW JERSEY.

PROCESS OF MANUFACTURING COMPOUNDS OF NITROGEN.

SPECIFICATION forming part of Letters Patent No. 657,938, dated September 18, 1900.

Application filed January 23, 1900. Serial No. 2,543. (No specimens.)

*To all whom it may concern:*

Be it known that I, CHARLES B. JACOBS, a citizen of the United States, residing at East Orange, in the county of Essex and State of New Jersey, have invented certain new and useful Improvements in Processes for the Manufacture of Compounds of Nitrogen, of which the following is a specification.

The process hereinafter described and claimed is an improvement on that set forth in my application, Serial No. 712,054, filed April 7, 1899, the object of this improvement being to produce a higher yield of cyanid. This I effect by making a porous carbid composition of an extreme degree of porosity and of unusually high carbid percentage in the material exposed to the action of the nitrogen, and such porosity and high percentage of carbid result from the formation, as a preliminary step in the process, of a coked mixture containing an alkali-earth material—say barium carbonate—impregnated throughout its mass and in most intimate contact with its cell-walls, so as to favor the combination of the carbid-producing elements to the greatest possible extent.

The process is carried out as follows: Barium carbonate is mixed and finely ground with an amount of coking-coal sufficient to furnish an excess of carbon over that required for the manufacture of barium carbid, the preferred proportion, by weight, being three parts of barium carbonate to two parts of soft coal. This mixture is then subjected to a coking-heat in an ordinary retort-oven. The resulting material is a porous mass of coke, into the cell-walls of which the barium carbonate is firmly fixed or cemented by the coking process. The material is charged into an electric furnace, preferably the rotary continuous type shown in my application above referred to, and subjected to heat sufficient to form barium carbid. A furnace of this kind, of usual size, producing one ton of carbid per day, will require a current of about fifteen hundred amperes at one hundred volts. The barium carbid melts over the particles of coke present in excess and forms a porous carbid composition, which after it passes the zone of highest heat in the rotary furnace solidifies, and then is subjected to the action of nitrogen or nitrogen-bearing gas, which at a temperature below the fusion-point of carbid is rapidly absorbed by the carbid, converting the latter into barium cyanid. It will be understood that when the mass cools below the fusion-point of the carbid the said mass will still be porous, owing to the separating and sustaining effect of the excess of carbon in the mass, and this carbon being in the extremely-porous form of coke, with the carbid distributed over its cell-walls, a maximum surface will be presented to the action of the nitrogen. The barium cyanid may be used as such or may be converted into various other nitrogen compounds by ordinary chemical means.

The advantages gained by operating with the raw materials necessary to form barium carbid in the manner above described are the high percentage of carbid and, what is of still more importance, the porosity for the production of the carbid in the above-described manner are especially favorable to a large yield of cyanid.

The heat energy of the electric furnace is sufficient to form the porous carbid composition and also, as the furnace cools down, to sustain the carbid for a considerable time at the temperature required for the absorption of nitrogen by the porous carbid. The operation is continuous and automatic from the point at which carbid is formed from the raw materials until the cyanid is discharged from the electric furnace. In the coked mixture charged into the furnace the contact between the carbon and the barium carbonate is extremely intimate and forms a higher yield of carbid for the heat expended than the ordinary mixtures do, and thus a corresponding increase in the yield of cyanid produced.

Having thus described my invention, what I claim as new, and desire to secure by Letters Patent, is—

1. The process of forming a cyanid which consists in forming a mixture of coking-coal with an alkaline-earth compound, there being present in the mixture an amount of carbon in excess of that required for the formation of carbid, submitting the said mixture to a coking heat to form a porous composition, consisting of coke having the alkaline-earth compound diffused through it, then subjecting the resulting material to the heat of an electric furnace, to cause formation of carbid and fusion of such carbid in and on the surface of the coke, forming a porous carbid composition, then allowing the mass to cool, and subjecting the mass to the action of nitrogen or nitrogen-bearing gases while at a temperature below the fusing-point of the carbid.

2. The process of forming a cyanid which consists in forming a mixture of coking-coal with an alkaline-earth compound, there being present in the mixture an amount of carbon in excess of that required for the formation of carbid, submitting the said mixture to a coking heat to form a porous composition, consisting of coke having the alkaline-earth compound diffused through it, then subjecting the resulting material to the heat of an electric furnace, to cause formation of carbid and fusion of such carbid in and on the surface of the coke, forming a porous carbid composition, then allowing the mass to cool, and during such cooling subjecting the mass to the action of nitrogen or nitrogen-bearing gases while at a temperature below the fusing-point of the carbid.

3. The process of forming barium cyanid which consists in forming a mixture of coking-coal with barium compound, there being present in the mixture an amount of carbon in excess of that required for the formation of carbid, submitting the said mixture to a coking heat to form a porous composition, consisting of coke having barium compound diffused through it, then subjecting the resulting material to the heat of an electric furnace, to cause formation of carbid and fusion of such carbid in and on the surface of the coke, forming a porous carbid composition, then allowing the mass to cool, and subjecting the mass to the action of nitrogen or nitrogen-bearing gases while at a temperature below the fusing-point of the carbid.

CHARLES B. JACOBS.

Witnesses:
J. GREEN,
A. P. KNIGHT.